United States Patent [19]

Johnson et al.

[11] Patent Number: 6,005,925
[45] Date of Patent: *Dec. 21, 1999

[54] BIDDING FOR TELECOMMUNICATIONS TRAFFIC OVER ROUTE SEGMENTS

[75] Inventors: Jack J. Johnson; William F. Coyle, both of Summit, N.J.

[73] Assignee: Summit Telecom Systems, Inc., Summit, N.J.

[ * ] Notice: This patent is subject to a terminal disclaimer.

[21] Appl. No.: 09/010,609

[22] Filed: Jan. 22, 1998

Related U.S. Application Data

[63] Continuation-in-part of application No. 08/804,542, Feb. 24, 1997, abandoned, and application No. 09/003,170, Jan. 6, 1998

[60] Provisional application No. 60/068,888, Dec. 26, 1997.

[51] Int. Cl.⁶ .................................................. H04M 15/00
[52] U.S. Cl. .......................... 379/112; 379/114; 379/220; 379/221
[58] Field of Search ..................................... 379/111, 112, 379/113, 114, 133, 220, 221, 121, 201, 34, 144; 455/405, 406, 219

[56] References Cited

U.S. PATENT DOCUMENTS

| | | | |
|---|---|---|---|
| 4,410,765 | 10/1983 | Hestad et al. | 379/112 |
| 4,577,066 | 3/1986 | Bimonte et al. | 379/112 |
| 4,585,904 | 4/1986 | Mincone et al. | 379/112 |
| 4,706,275 | 11/1987 | Kamil | 379/112 |
| 4,751,728 | 6/1988 | Treat | 379/114 |
| 4,831,649 | 5/1989 | Mejane | 379/112 |
| 4,972,464 | 11/1990 | Webb et al. | 379/112 |
| 5,163,042 | 11/1992 | Ochiai | 379/112 |
| 5,173,933 | 12/1992 | Jabs et al. | 379/112 |
| 5,289,536 | 2/1994 | Hokari | 379/112 |
| 5,400,395 | 3/1995 | Berenato | 379/112 |
| 5,425,084 | 6/1995 | Brinskele | 379/112 |
| 5,425,085 | 6/1995 | Weinberger et al. | 379/112 |
| 5,473,630 | 12/1995 | Penzias et al. | 379/112 |
| 5,515,425 | 5/1996 | Penzias et al. | 379/112 |
| 5,519,769 | 5/1996 | Weinberger et al. | 379/112 |
| 5,532,939 | 7/1996 | Psinakis et al. | 379/112 |
| 5,553,124 | 9/1996 | Brinskele | 379/112 |
| 5,606,602 | 2/1997 | Johnson et al. | 379/115 |
| 5,652,841 | 7/1997 | Nemirovsky et al. | 379/112 |
| 5,781,620 | 7/1998 | Montgomery et al. | 379/115 |
| 5,790,642 | 8/1998 | Taylor et al. | 379/112 |
| 5,802,502 | 9/1998 | Gell et al. | 379/114 |

*Primary Examiner*—Paul Loomis
*Assistant Examiner*—Rexford N Barnie
*Attorney, Agent, or Firm*—Allen N. Friedman; McCarter & English L.L.C.

[57] ABSTRACT

Telecommunications switches route calls in accordance with economic incentives (e.g., least cost routing) resulting from a bidding process between participating telecommunications carriers (Carriers) by operation of a central processor, a computer referred to as a bidding moderator (Moderator). Each of the Carriers bidding for traffic informs the Moderator of the rate it is willing to charge (or other economic incentive it is willing to offer) for service at some particular time between two specific switching points defining a route segment in one or more telecommunications networks, for example, from an intermediate switching point on one telecommunications network to a terminating local exchange switch on another network. This "bid" rate may be lower than that Carrier's established rate for any of several reasons (e.g., the Carrier has excess capacity on that route segment at that time). The Carrier may change its bids as often as it likes as traffic patterns change. The Moderator collects this bid information from all the Carriers, processes the bid information and transmits carrier selection information to subscribing switches. Bid information is also transmitted to participating Carriers' network management centers. From the list of all Carriers providing bid information to the Moderator, each subscribing switch can select those Carriers to which it wants traffic routed and can change that selection at any time.

36 Claims, 11 Drawing Sheets

BIDDING FOR TELECOMMUNICATIONS TRAFFIC OVER ROUTE SEGMENTS

CONTINUATION-IN-PART

This application is a Continuation-in-Part of application Ser. No. 08/804,542 filed Feb. 24, 1997 now abandoned and co-pending application Ser. No. 09/003,170 filed Jan. 6, 1998, and depends for priority on Provisional Application Ser. No. 60/068,888 filed Dec. 26, 1997 now abandoned.

BACKGROUND OF THE INVENTION

1. Field of the Invention

The invention is in the field of telecommunication network control.

2. Description of the Background Art

Many locally managed telecommunication systems, such as PBXs, employ "least cost routing" software to reduce telecommunication costs. The system's manager arranges with more than one interexchange carrier to carry the system's traffic from the local exchange to which it is connected to other exchanges. The manager keeps track of each carrier's charges and populates the routing table in the "least cost routing" software. The charges may be the regularly tariffed charges of the subscriber's primary carrier or contracted charges offered by an alternate carrier for a bulk discount or for discounting traffic during a specific time period during the day. The "least cost routing" software will examine each call attempt and automatically decide which carrier is the best economic choice for that call. If the call attempt fails, the software usually defaults the call attempt to the subscriber's primary carrier.

Telecommunication carriers regularly enter into wholesale contractual arrangements with other carriers to use part or all of such other carriers' telecommunications networks, for example, to complete calls to geographic regions the first carrier does not serve or to provide additional capacity on routes, or portions of routes, for which the first carrier may have little or no available capacity on its own network facilities at that time.

Recently a great deal of competition has developed between telecommunication carriers. This has been stimulated by both regulatory and technological changes. As telecommunication becomes more of a commodity it would be of great benefit to consumers to stimulate this competition and facilitate both a carrier's and a consumer's ability to make economic choices between telecommunication carriers.

In the method and system of the invention disclosed in U.S. Pat. No. 5,606,602, telecommunication switches route calls in accordance with economic incentives (e.g., least cost routing) resulting from a bidding process between participating telecommunication carriers (the "Carriers"), administered by a bidding service provider through operation of a central processor, a computer referred to as a bidding moderator (the "Moderator"). In that arrangement, each of the Carriers transmits to the Moderator the rate it is willing to charge (or other economic incentive it is willing to offer) for service between two specific points, from an originating point to a terminating point, at some particular time. The Moderator collects this bid information from all the Carriers, sorts it among originating points, and transmits it to each appropriate switch location and to participating Carriers' network management centers. Each subscribing switch (a "Subscriber") gets such information from the Moderator for all "point-to-point routes" originating in the Subscriber's local exchange area. The Moderator provides each Carrier with bid information from competing Carriers for all point-to-point routes for which any Carrier has submitted a bid (e.g., any NPA-NXX to any other NPA-NXX, or otherwise-defined telecommunications network destination, in the world). The Carriers receiving this information will have the opportunity thereafter to submit a lower or higher bid for any point-to-point routes on which they wish, respectively, to stimulate or discourage additional traffic. Through this bidding process, Carriers can compete for traffic on selected routes or compete for traffic originating from selected points in telecommunication networks. They can also manage their network traffic by adjusting their bids from time to time, depending on network traffic information or other network information.

The specification in U.S. Pat. No. 5,606,602 (starting on column 4, line 63 thereof) discloses in part the following:

The economic choices presented to telecommunication service users under this invention depend on bids submitted by Carriers for telecommunication traffic over the routes they serve. Each route is defined by the local exchange switch serving its originating point and the local exchange switch serving its terminating point. Each local exchange switch is identified in the North American Numbering Plan by a unique NPA-NXX code, where the NPA is a three digit numbering plan area identifier (e.g., area code 201 identifies Northern New Jersey) and NXX is a three digit code identifying a particular local exchange switch within the numbering plan area . . . The subscribing switch may also have dedicated direct links to one or more carrier points of presence. If such a carrier is selected, the subscribing switch would route the call attempt directly to that link. While the currently predominant numbering scheme for network switching end points is the North American Numbering Plan, other numbering schemes identifying route originating points and terminating points are possible and may be used as telecommunication technology evolves.

In the disclosed architecture a "route" is defined by the network switching end point serving the originating point of such route and the network switching end point serving the terminating point of such route. Network switching end points can be referred to as local exchange switches. A local exchange switch (or equivalent local switching node) is generally considered to be (i) the switching point on a telecommunications network that serves as the most immediate switching interface between the calling party and that telecommunications network as well as (ii) the switching point on a telecommunications network (which may, but need not be, owned or operated by the same carrier who owns or operates the originating switching point) that serves as the most immediate switching interface between the called party and that telecommunications network, regardless of whether such telecommunications networks use circuit-switched, frame relay, asynchronous transfer mode, packet data, TCP/IP protocols or other current or evolving telecommunication technologies. Local exchange switches (or equivalent local switching nodes), for example, may include telephone companies' local central office switches, private telecommunications networks' local access nodes, and Internet service providers' local access switches—whether represented by a server, router or other switching device (which may be hardware or software-defined), but in each case providing access to the respective telecommunications network. These network switching end points define a "route" for which Carriers can submit bids to the Moderator as described in U.S. Pat. No. 5,606,602, in order to compete to provide service to end users attempting to make calls over such routes.

U.S. Pat. No. 5,606,602 further discloses that a subscribing switch (e.g., a PBX) may also have dedicated direct links to one or more Carrier points of presence and, if such a Carrier is selected to carry a specific call, the subscribing switch would route the call attempt directly to that dedicated direct link (without, for example, being handled by the local exchange switch that may otherwise serve that subscribing switch).

Carriers may submit bids for route segments to the Moderator for different types of telecommunications networks (e.g., circuit-switched, frame relay, asynchronous transfer mode, packet data networks such as the Internet, etc.) and for different classes of telecommunications service provided by such networks (e.g., transmission of voice, data, video, etc.). Access to such telecommunications networks or facilities by end users or by other telecommunications carriers or service providers may be, for example, via the public switched telephone network, dedicated facilities, private lines, wireless facilities, coaxial cable, electric utility power lines, Ethernet or other local area network (LAN), metropolitan area network (MAN) or wide area network (WAN) connections.

SUMMARY OF THE INVENTION

Provision of telecommunication services is presently dominated by fixed contractual relationships, between service providers on a wholesale basis and between users and service providers on a retail basis. However, because of technological and regulatory changes, telecommunication service is becoming more of a commodity, with competition between service providers for traffic. The herein disclosed invention stimulates this competition and facilitates a service provider's and consumer's ability to make economic choices between telecommunication Carriers. In this method and system, telecommunication switches route calls in accordance with economic incentives (e.g., least cost routing) resulting from a bidding process between participating telecommunication Carriers, administered by a bidding service provider through operation of a central processor, a computer referred to as a bidding Moderator. The herein disclosed invention offers telecommunication Carriers the opportunity to compete to provide service over portions of a route when service between an originating point and terminating point passes through switching points on one or more telecommunications networks that lie between the network switching end points (e.g., local exchange switches or local points of presence) serving the originating points and terminating points, respectively, of a call.

In this arrangement, each of the Carriers transmits to the Moderator the rate it is willing to charge (or other economic incentive it is willing to offer) for service between two specific switching points on one or more telecommunications networks, at some particular time. This "bid" rate may be for a route or a route segment. For purposes of differentiating in this document between a route and route segment, a "route" is service from the "originating switching point," i.e., the switching point on a telecommunications network that serves as the most immediate switching interface between the calling party and that telecommunications network (e.g., a local exchange switch or equivalent local switching node, whether hardware or software-defined, providing access to that network), to the "terminating switching point," i.e., the switching point on a telecommunications network (which may, but need not be, owned or operated by the same carrier who owns or operates the originating switching point) that serves as the most immediate switching interface between the called party and that telecommunications network (e.g., a local exchange switch or equivalent local switching node, whether hardware or software-defined, providing access to that network). A "route segment" is any and all of the following: (i) service from an originating switching point on a telecommunications network to an "intermediate switching point" on the same or different telecommunications networks, such "intermediate switching points" being all switching points on one or more telecommunications networks that do not serve as the most immediate switching interface between the calling party and a telecommunications network or the most immediate switching interface between the called party and a telecommunications network, but do serve as switching points elsewhere in the telecommunications network or networks over which a call attempt may be routed (e.g., a tandem switch, a high-speed router or some other hardware or software-defined intermediate switching node on a telecommunications network); (ii) service from one intermediate switching point on a telecommunications network to another intermediate switching point on the same or different telecommunications networks; and (iii) service from an intermediate switching point on a telecommunications network to a terminating switching point on the same or different telecommunications networks.

Carriers may submit bids for route segments to the Moderator for different types of telecommunications network (e.g., circuit-switched, frame relay, asynchronous transfer mode, packet data networks such as the Internet, etc.) and for different classes of telecommunications service provided by such networks (e.g., transmission of voice, data, video, etc.). Access to such telecommunications networks or facilities by end users or by other telecommunications carriers or service providers may be, for example, via the public switched telephone network, dedicated facilities, private lines, wireless facilities, coaxial cable, electric utility power lines, Ethernet or other local area network (LAN), metropolitan area network (MAN) or wide area network (WAN) connections.

The bid rate may be lower than that Carrier's established rate for any of several reasons (e.g., the Carrier has excess capacity on a particular route segment at that time). The Carrier may, for example, also decide for capacity or competitive reasons to place the same bid (i) on all traffic having the same originating switching point independent of which intermediate switching points such traffic may pass through, or (ii) on all traffic having the same terminating switching point independent of which intermediate switching points such traffic may pass through. The Carrier may change its bids as often as it likes during the day as traffic patterns change. The Moderator collects this bid information from all the Carriers, sorts it among switching points, and may further process this bid information, for example, to select Carriers for particular route segments or for individual calls. This carrier selection information may include a prioritization of the Carrier selection in accordance with Carriers' bids for each route segment. The Moderator then transmits selected portions of this information to each appropriate subscribing switch location and to participating Carriers' network management centers. Each subscribing switching point (a "Subscriber") gets the rate information or carrier selection information from the Moderator for all "point-to-point" route segments for service from the Subscriber to all other switching points. The Moderator provides each Carrier with bid information from other Carriers for at least a portion of all "point-to-point" route segments for which any Carrier has submitted a bid (e.g., any originating NPA-NXX to any intermediate switching point on the public switched telephone network in the world). A route segment may be entirely contained within a single local exchange area.

From the list of all Carriers providing bid information to the Moderator, each Subscriber can select those Carriers to which it wants traffic routed and can change that selection at any time. The Subscriber downloads the bid information and/or carrier selection information of those selected Carriers into the routing tables in its switch. After each new bid is submitted by a Carrier and is processed by the Moderator, the rate and/or carrier selection information will be distributed to the relevant Subscribers and rate information will be distributed to other Carriers. The Carriers receiving the information will have the opportunity thereafter to submit a lower or higher bid for any point-to-point route segment on which they wish, respectively, to stimulate or discourage additional traffic.

Through this bidding process, Carriers can compete for traffic on selected route segments in telecommunication networks. They can also manage their network traffic by adjusting their bids from time to time, depending on network traffic information or other network information. And users as well as other telecommunication service providers (who may, for example, wish to use the bidding process to obtain a lower rate for resale to customers) can easily make economic choices.

DETAILED DESCRIPTION OF THE INVENTION

Figure 1:
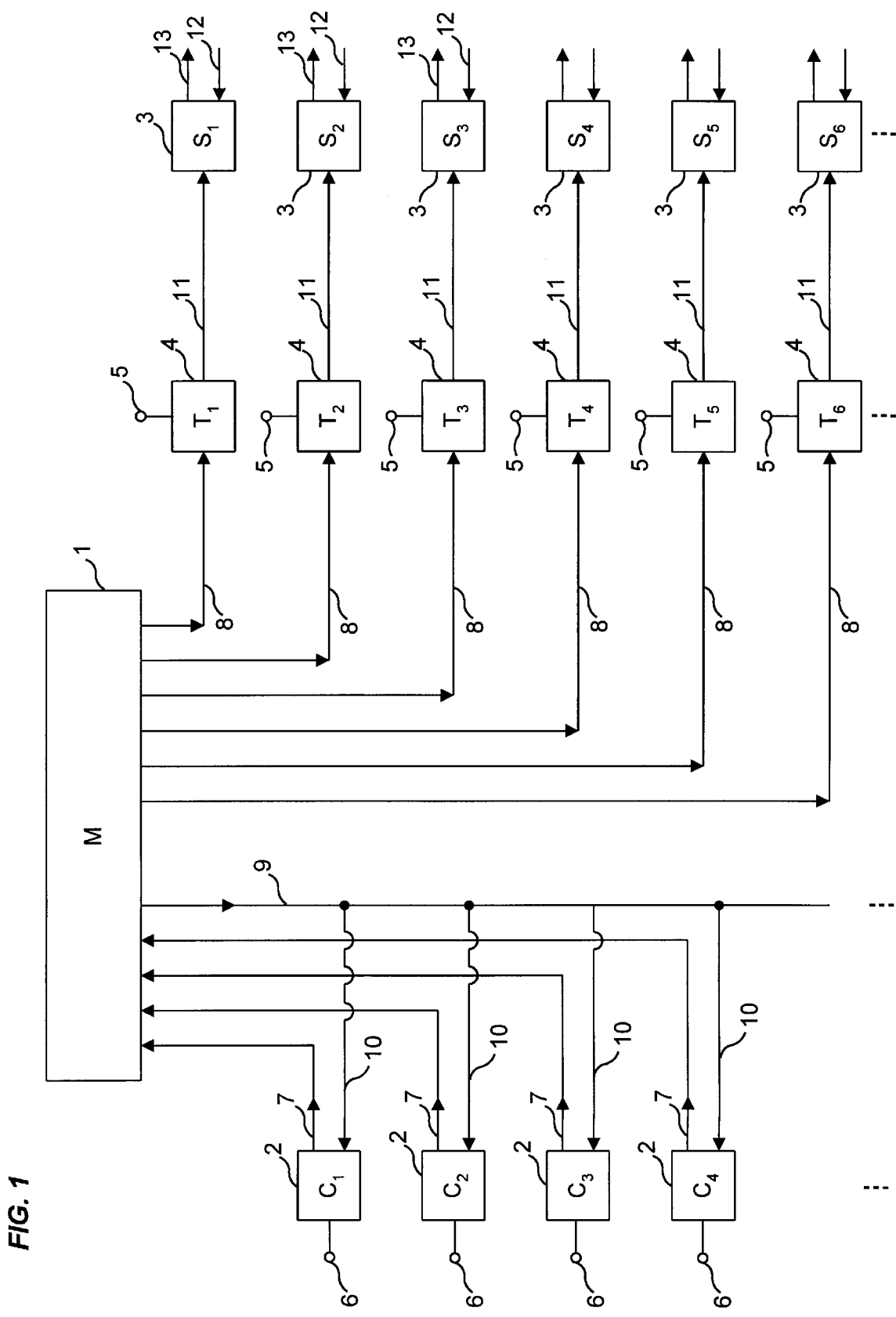
FIG. 1 is a schematic view of an exemplary system of the invention showing dedicated communications lines from each Carrier to the Moderator, from the Moderator to each of the subscribing switches, and a common data link from the Moderator to each of the Carriers.

FIG. 1 shows an exemplary system for carrying out the herein disclosed bidding process for telecommunication services, in which a Moderator 1 administers collection and dissemination of bidding information. The Moderator 1 includes a computer with a processor and memory, together with input and output devices to communicate with the Carriers' network management computers 2, which are the source of the bidding information, and the subscribing switches 3 (Subscribers), which are the ultimate users of the information.

The Carriers are, primarily, Carriers that carry telecommunication traffic between switching points on telecommunications networks. By means of the FIG. 1 system, for example, the Carriers bid for traffic from subscribing switches 3, associated with a switching point on a telecommunications network, to other switching points on the same or different telecommunications networks. Some circumstances may result in the bidding process controlling carriage of a call over route segments within a single local exchange area. The Carriers transmit their bids from their network management computers 2 over data links 7, which may be either analog (using modems) or digital. However, the information is usually transmitted in digital form for input into the Moderator 1. Each Carrier has a network administrator who enters network management instructions into each network management computer 2 through input port 6 by means, for example, of a keyboard or a data link from a remote site or local computer.

The Moderator 1 receives the bids, processes them in its processor to produce carrier selection data, and enters both into a database in its memory by means of the data buses and registers internal to a computer. The carrier selection data, applicable to each Subscriber 3, are transmitted to such switch 3, perhaps by way of a computer 4 adjunct to the switch 3 over a data link 8. The data link 8 is illustrated as a dedicated transmission facility between the Moderator 1 and each switch 3. However, any other transmission technology offering a selective way to transmit data from the Moderator 1 to the switch may be used. (A "transmission facility" is a telecommunication path or channel. It may be, for example, a wired link, a radio channel in a wireless system, or a time slot in a digitally multiplexed optical transmission system). The data inputs and outputs of the Moderator 1, the network management computers 2, the adjunct computers 4, and the switches 3 are implemented by such devices as interfaces, registers and modems that are well known in the art.

Figure 6:
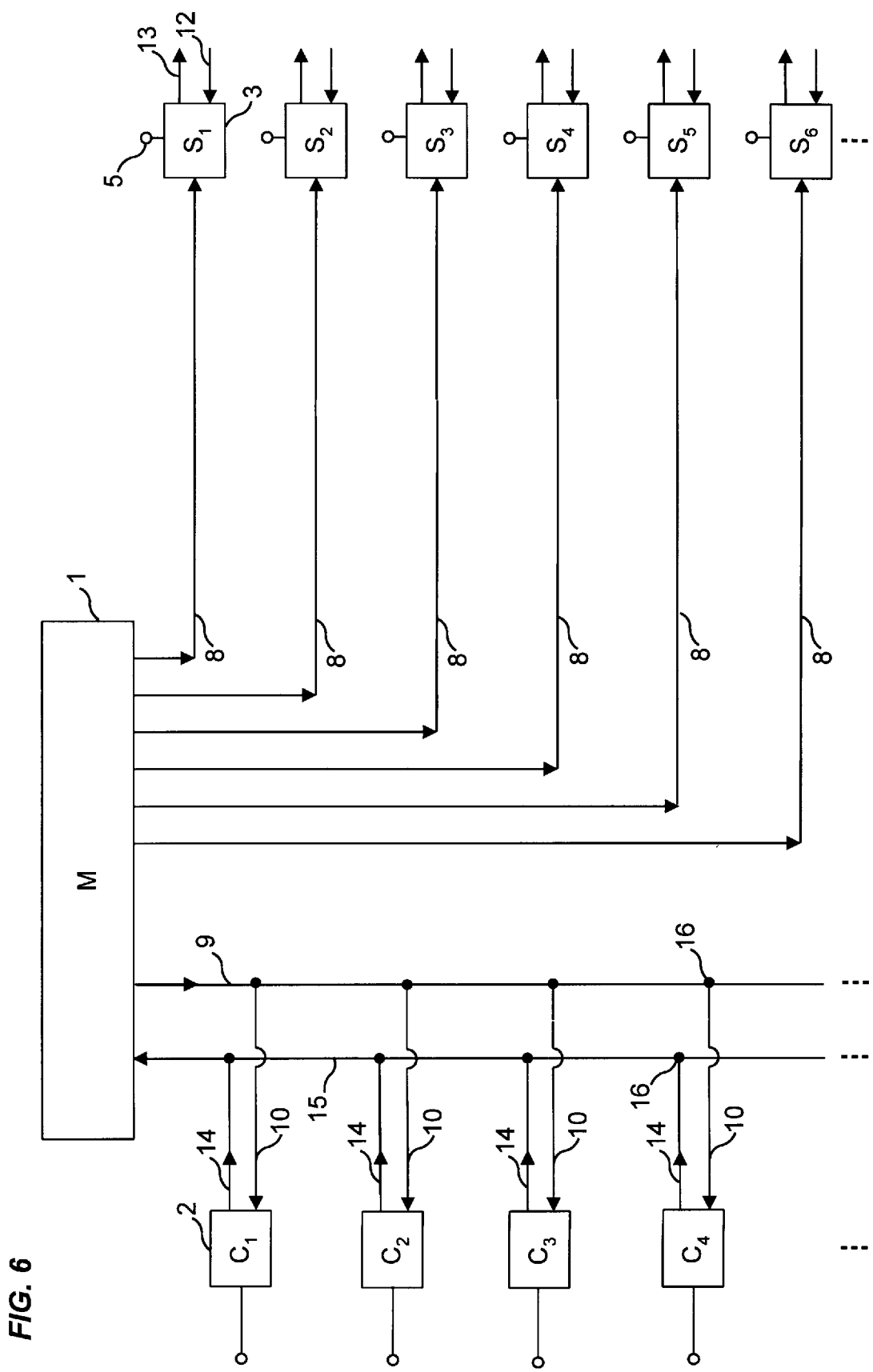
FIG. 6 is a schematic view of an exemplary system of the invention in which the Moderator transmits data directly to its switches.

As illustrated in FIG. 6, the Moderator 1 processes the bids to prioritize them for each route segment, producing derivative data, including carrier selection data. This data can reflect, for example, designation of a selected Carrier and alternate Carriers, based on the Carriers' bids for each route segment. The Moderator 1 transmits the applicable bids and/or the derivative data to the switch 3. The Moderator 1 or the switch 3 can also designate a default Carrier in the event a call cannot be completed via a Carrier selected by the bidding process. The switch 3 can also be equipped to override the Moderator's selection in accordance with decision rules from the switch administrator 5.

An adjunct computer is known in the art to be a computer, closely associated with a switch, that provides the switch's operating software additional data or operating logic to provide the switch with additional operational capability. In the herein disclosed architecture, while primary processing of the bid data to produce carrier selection data is performed in the Moderator, as illustrated in FIG. 1, the adjunct computer 4 can be employed to enter the carrier selection data received from the Moderator 1 into a database in its memory and receive, through input port 5, decision rules from the switch administrator. Software in the adjunct computer's processor can then access the data in memory and apply the decision rules to the carrier selection data, producing the data required to populate the routing tables of the least cost routing software in the switch 3. The adjunct computer 4 communicates with the switch 3 over a digital data link or data bus 11. If the switch 3 has enough processing capacity, the function of the adjunct computer 4 may be incorporated in the switch's processor and memory, the function being implemented in the processor by appropriate software. In this case the switch must also provide input ports to receive transmission link 8 and input 5 from the switch administrator. Each switch 3 receives call attempts over incoming lines 12. Each call attempt includes routing data identifying the call's destination. The switch's least cost routing software then selects the Carrier to which the call attempt shall be routed over outgoing line 13.

Figure 7:
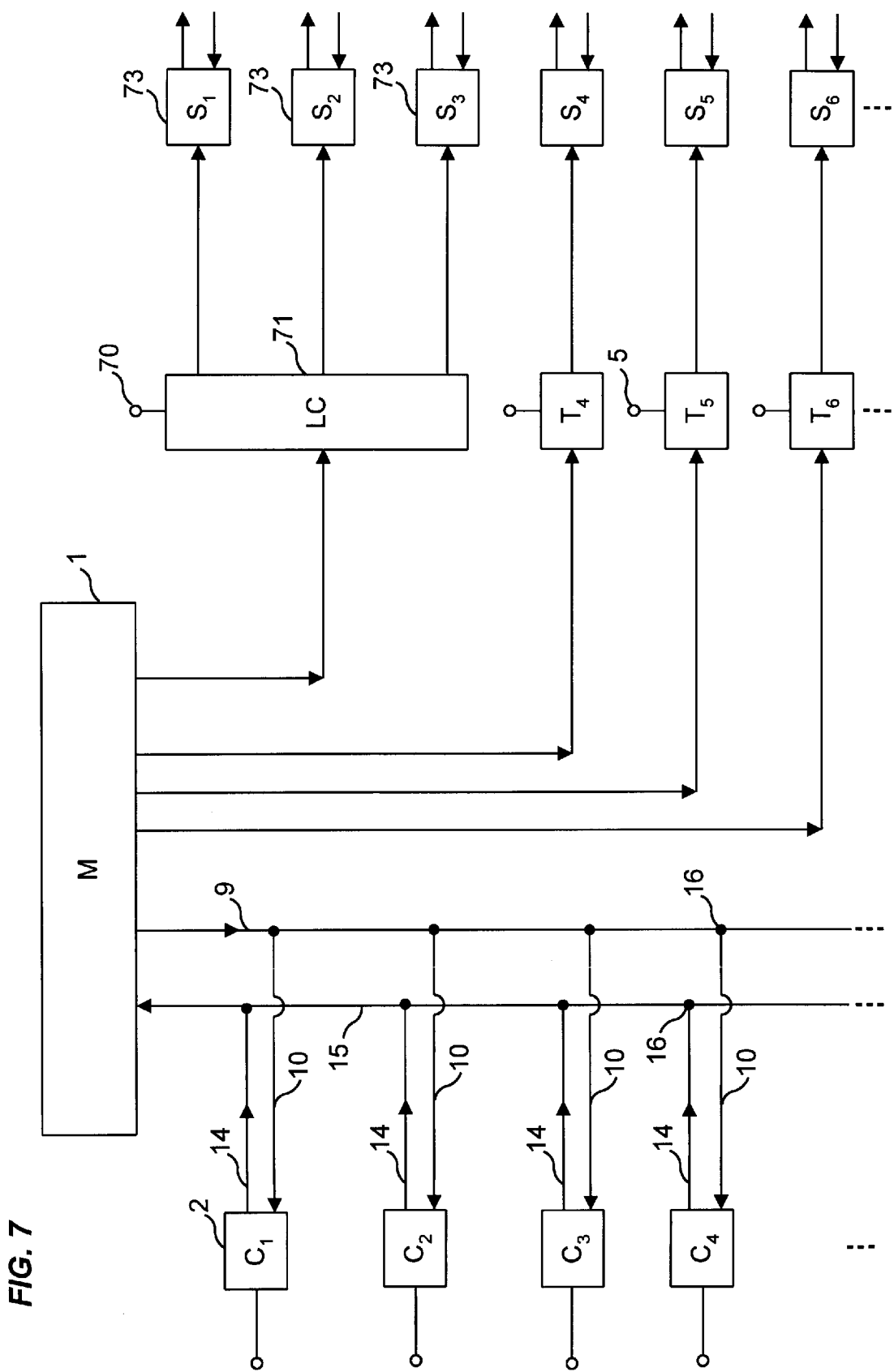
FIG. 7 is a schematic view of an exemplary system of the invention in which the Moderator transmits data to a computer associated with a plurality of switches.

In the implementation illustrated in FIG. 7, an adjunct computer 71, perhaps belonging to a local exchange carrier, receives the carrier selection data from the Moderator 1, further processes the data and controls Carrier selection in the switches 73 under its control. Routing tables in the switches 73 can be populated periodically by data from the adjunct computer 71 or the switch 73 can query the adjunct computer 73 as each call attempt is presented. The adjunct computer 71 can receive selection rules and other administrative directions from a local carrier administrator 70.

An alternative for end users to use of a PBX, a private switch, is subscription to Centrex service, in which the end users' originating switching point is a software-defined portion of the local central office switch of the local exchange telephone carrier. With data links between the adjunct computer 4 and the local central office switch, the end users' switch administrator can administer the end user portion of the bidding process in much the same way as if a PBX were being administered. In addition, instead of using a PBX or subscribing to a Centrex service, a residential or business customer could subscribe to a "least cost routing" feature offered by the local exchange telephone carrier as part of its enhanced calling services (currently including call waiting, call forwarding, 3-way calling, speed dialing, etc.). As with Centrex service the end users' switch enabling these enhanced calling features is a software-defined portion of the local central office switch.

The Moderator 1 also transmits received bids to the network management computers 2 of Carriers over the data link 9, 10. The exemplary architecture of FIG. 1 shows a combination of a single output data link 9 and individual Carrier input links 10 for this Moderator-to-Carriers bid data, indicating that the Moderator 1 may send the same data to all Carriers. There are many alternate transmission technologies available to broadcast this bid data to all Carriers, including dedicated bidirectional links between the Moderator 1 and each Carrier, combining the function of links 7, 9, and 10.

Depending on the particular implementation, it may be appropriate to transmit all received bids to all Carriers. However, each Carrier's bids need not be transmitted back to the bidding Carrier and there may be Carriers with limited service areas that are not interested in receiving bids from out-of-area Carriers. In any event, at least a portion of the bids are transmitted to a least a portion of the Carriers in order to implement an auction.

Figure 2:
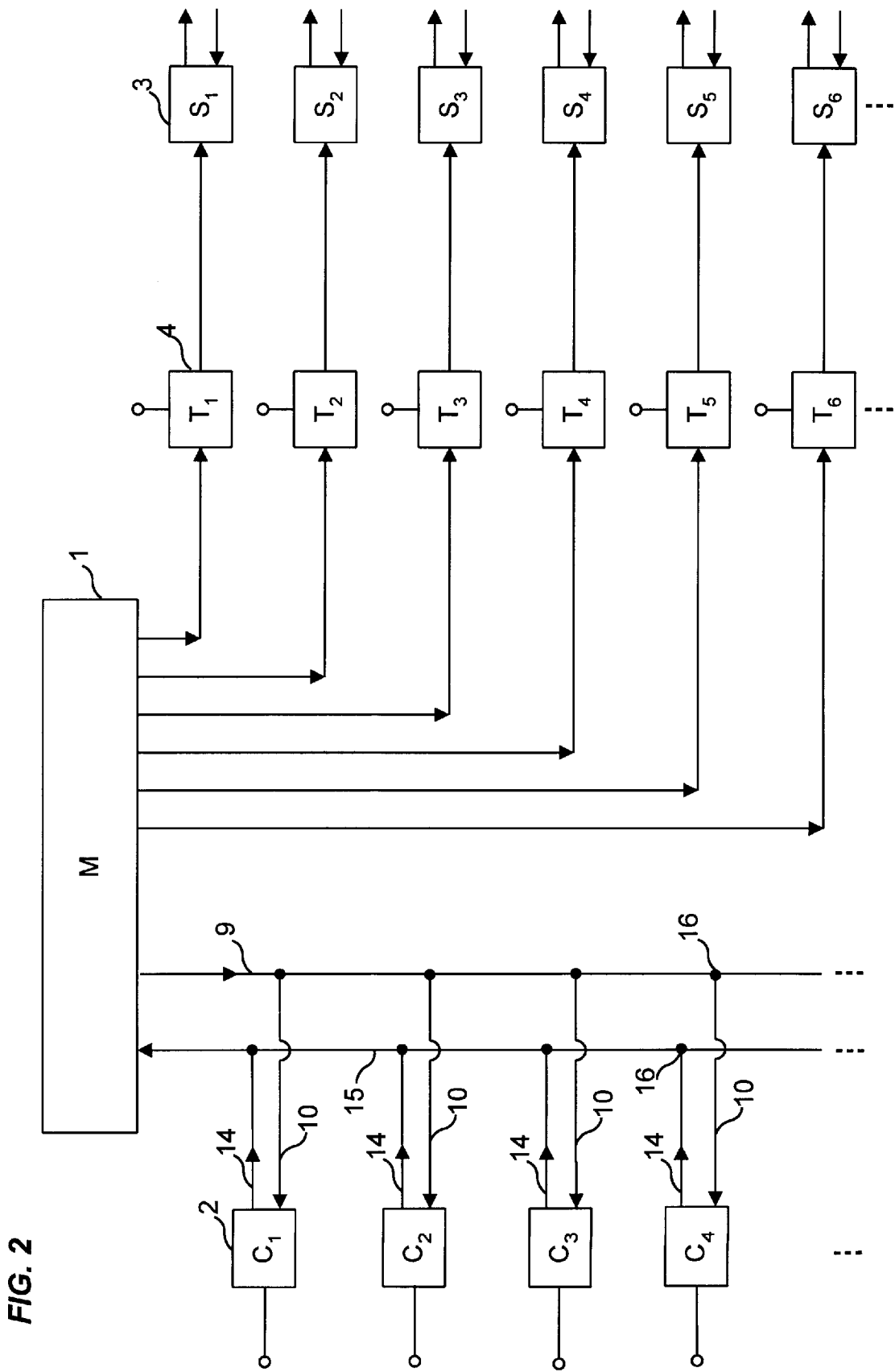
FIG. 2 is a schematic view of an exemplary system of the invention showing the Carriers using a shared data link to provide information to the Moderator.

FIG. 2 illustrates an alternative network architecture in which the individual Carrier-to-Moderator data links 14 share a common data input line 15 into the Moderator 1. This can be done, for example, by means of fiber optics using the SONET transmission protocol and ATM technology. This would require an ATM switching module at each junction 16 between the individual Carrier links 10, 14 and the common Moderator input-output links 9, 15.

Figure 3:
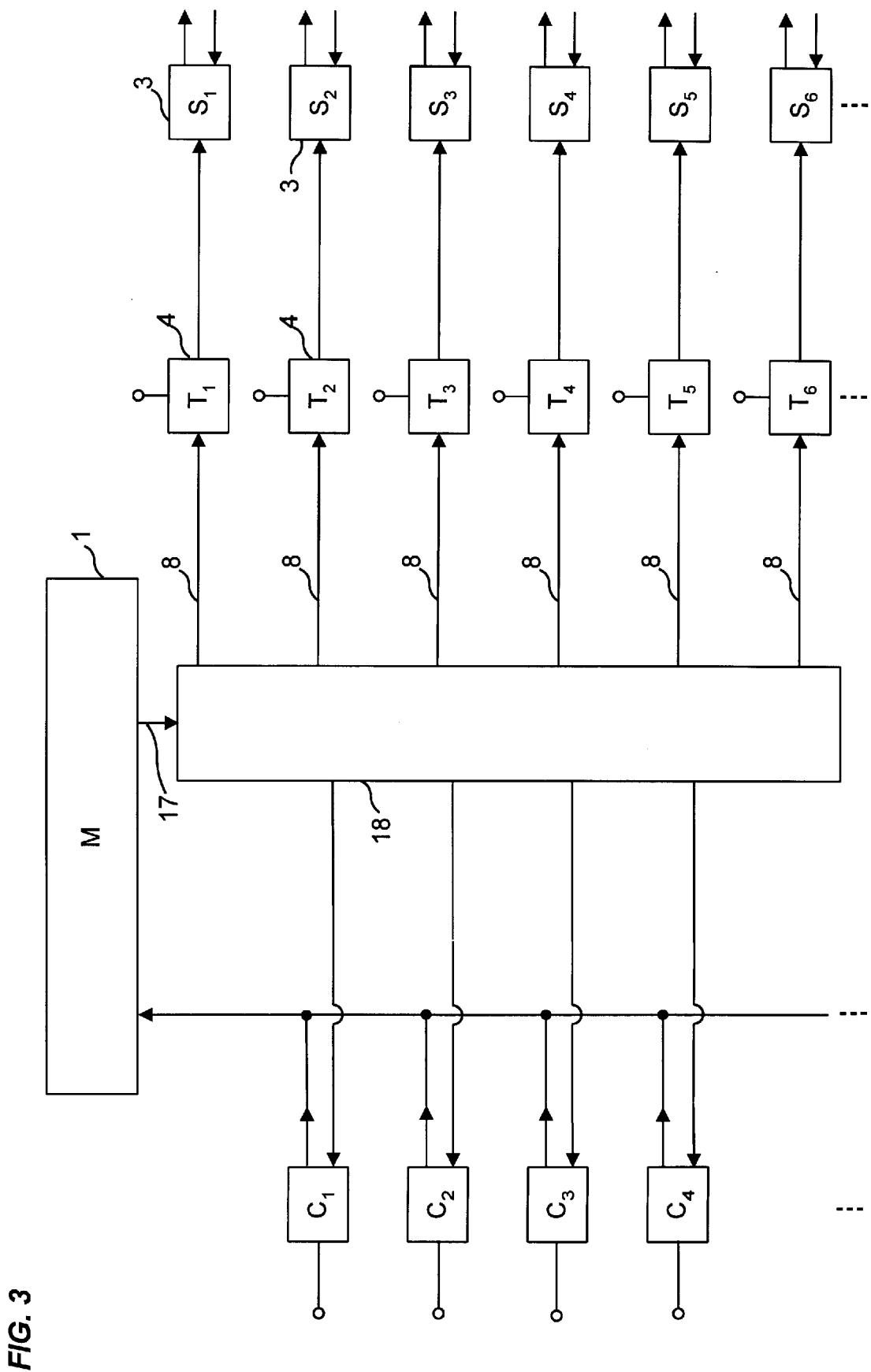
FIG. 3 is a schematic view of an exemplary system of the invention showing switched access from the Moderator to each of the subscribing switches and to each Carrier.

FIG. 3 illustrates an architecture incorporating switched access from the Moderator 1 to the switches 3. In this architecture a single Moderator output link 17 transmits each subscribing switch's bid data to a switch 18, which may be a dedicated switch or part of a public switched network. The bid information appropriate to each subscribing switch 3 is switched to each individual switch data link 8.

Figure 4:
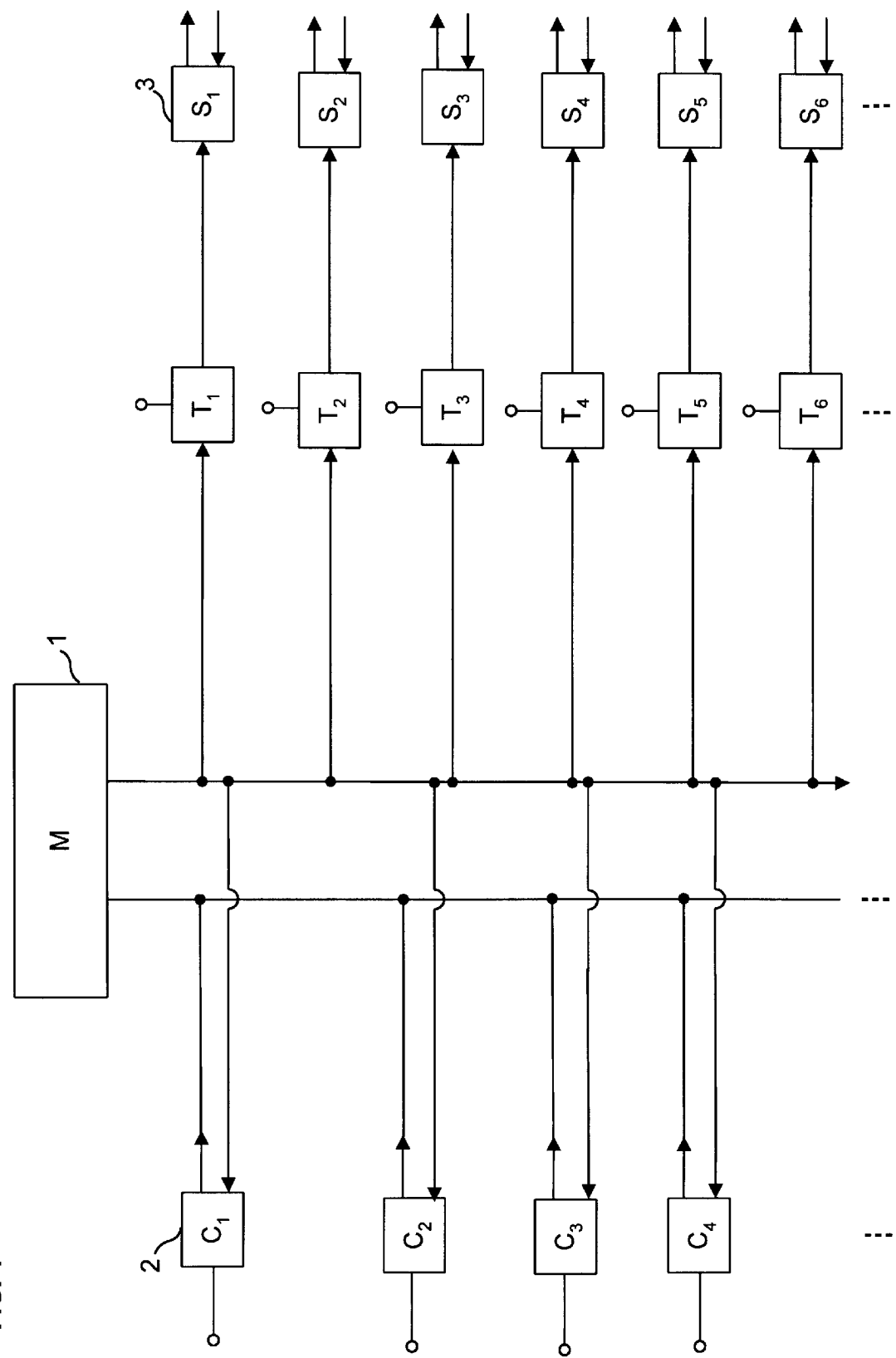
FIG. 4 is a schematic view of an exemplary system of the invention showing use of a shared data facility, such as a local area network, for communication from the Moderator to each of the subscribing switches and to each Carrier.

FIG. 4 illustrates use of shared facilities between the Moderator 1 and each of the switches 3 and the Carriers' network management computers 2. This could be accomplished, for example, by many known local area network (LAN), metropolitan area network (MAN), and wide area network (WAN) technologies.

The economic choices presented to telecommunication service users under this invention depend on bids submitted by Carriers for telecommunication traffic over the route segments they serve. A "route segment" is any and all of the following: (i) service from an originating switching point on a telecommunications network to an "intermediate switching point" on the same or different telecommunications networks, such "intermediate switching points" being all switching points on one or more telecommunications networks that do not serve as the most immediate switching interface between the calling party and a telecommunications network or the most immediate switching interface between the called party and a telecommunications network, but do serve as switching points elsewhere in the telecommunications network or networks over which a call attempt may be routed (e.g., a tandem switch, a high-speed router or some other hardware or software-defined intermediate switching node on a telecommunications network); (ii) service from one intermediate switching point on a telecommunications network to another intermediate switching point on the same or different telecommunications networks; and (iii) service from an intermediate switching point on a telecommunications network to a terminating switching point on the same or different telecommunications networks. A route segment may also be entirely contained within one local exchange area.

To identify originating and terminating switching points for telephone calls within North America, for example, each local exchange switch on the public switched telephone network is designated in the North American Numbering Plan by a unique NPA-NXX code, where the NPA is a three digit numbering plan area identifier (e.g., area code 201 identifies Northern New Jersey) and NXX is a three digit code identifying a particular local exchange switch within the numbering plan area. It is common for a single local exchange switch to house more than one NXX Code. The interexchange Carriers that utilize this bidding process are usually identified by a Carrier access code. This code may be, for example, a "1" signifying the end user's primary Carrier, a 5 digit code "10XXX" for a Carrier other than the end user's primary Carrier, or some other code or data element designated for that purpose. Once a Carrier is selected for a call attempt, the appropriate Carrier access code may be inserted in the call attempt's routing data (e.g., NPA-NXX-XXXX, the last four digits identifying the particular line served by the called party's NPA-NXX switch on the public switched telephone network). The subscribing switch may also have dedicated direct links to one or more Carrier points of presence. If such a Carrier is selected, the subscribing switch would route the call attempt directly to that link. While the currently predominant numbering scheme for originating and terminating switching points on the public switched telephone network is the North American Numbering Plan, other numbering schemes identifying originating switching points and terminating switching points are possible, particularly for other types of telecommunication networks, and may be used as telecommunication technology evolves. International telephone calling, for example, currently uses a country code and a city code before the code that identifies the local exchange switch on the public switched telephone network. Each intermediate switching point in a telecommunications network has a unique identifier that is used in routing calls over route segments. Those identifiers can be used by the Moderator and the Carriers to manage the bidding process.

The competing Carriers bid for traffic by transmitting to the Moderator the economic incentive each Carrier will offer for traffic over each route segment it serves (or, at least, each route segment it wishes to compete for using the bidding process). The economic incentive presently contemplated as being most usual is the rate (amount of money charged per unit of time). However, many other kinds of economic incentives may be offered, such as a credit toward other services or a credit toward an additional rebate that may be offered if a user's traffic for a given month (or that of another telecommunications carrier reselling, for example, a Carrier's service between two switching points on that Carrier's telecommunications network facilities) rises above a threshold. The economic incentive could be a combination of rate and another incentive. But the economic incentive should be selected from a limited set authorized by the provider of the bidding mechanism, because the incentive must be capable of being evaluated by the software in the Moderator or in each subscribing switch's adjunct computer. A Carrier may wish to submit more than one bid for route segments that start at switching points at which it offers more than one class of service (e.g., switched service to some subscribers, dedicated access to others, high-speed service to still others, or combinations of different classes of service to some users).

Each bid must be associated with a time period within which the bid will be effective. The rules of the bidding process can be structured in many ways. The following are examples of possible bidding rules.

a) The day is divided into blocks of time by the bidding service provider and bids are submitted for each block of time. All bids for a given block of time must be submitted prior to a cut-off time that precedes that block of time by a protection interval. Any bid received after the cut-off time is considered to be effective for the next block of time, unless a new bid is subsequently received from the same Carrier for that route segment. The protection interval is needed to permit processing of the bid information by the Moderator and transmission of carrier selection data or bid information to the switch (or its associated adjunct computer) prior to the bid's start time. For example, if thirty minute blocks of time are auctioned, a five minute protection interval may be appropriate.

b) Carriers are permitted to submit bids for any time interval by specifying a start time and a termination time or a start time and a good-until-cancel instruction. However, no bid can be effective before a protection time interval specified by the bidding service provider. The bidding service provider can provide confirmation of received bids back to the Carrier if the data link from the Moderator to the Carriers is provided with a selective messaging capability.

c) Carriers may be permitted to enter default bids for any route segment and/or block of time for which they transmit no other bid.

d) As a fail-safe mechanism, to avoid use of old bids that have not been changed due to communication failure, the Moderator may impose a rule setting a time limit (a fail-safe protection time) to the applicability of any bid. At the expiration of the time limit, the expired bid could default to a preset default bid or to no bid. Such a rule could also be built into the switch software to protect against a failure in the Moderator-to-switch data link.

The principal data feedback from the Moderator to the Carriers is the broadcast of bidding data from the Moderator to each of the Carriers. This permits the Carriers to adjust their own bids for any particular route segment in view of other Carriers' bids for that route segment. In a block of time bidding scheme this broadcast transmission may take place, in different service offerings, either before or after the bid cutoff time for a given block of time. If broadcast before the cutoff time, the Carriers have an opportunity, up to the cutoff time, to adjust their bids for that block of time. If the service is arranged for broadcast back to the Carriers after the cutoff time, the Carriers can adjust their bids for the next or subsequent blocks of time. If the bids are broadcast back to the Carriers after the cutoff time but before the bid's effective time, the Carriers would be able to manage their networks to take account of that time interval's bid structure. The bids can be adjusted to be higher or lower, dependent on whether the Carrier, in view of the state of its network traffic, wishes to further encourage or discourage additional traffic. The Carrier may wish to reduce its bid, for example, to encourage additional traffic on an underutilized telecommunication facility, or increase its bid to discourage traffic over a facility approaching a congested state. Depending on the transmission and computer technologies used, broadcast back to the Carriers could also be accomplished by posting the bids on a bulletin board system, making them available for retrieval by all Carriers.

An evolutionary development in local exchange switch architecture is the combination of a "dumb" switch and a "smart" peripheral computer. In this arrangement the switch accomplishes the actual connection between incoming and outgoing telecommunication facilities and the switch operating software performs the management functions specifically sup porting the switching function. The peripheral computer contains the service-related software. This arrangement permits the telecommunication service provider to modify its service offerings without the need to ask the switch manufacturer to change the switch's operating software. Through use of an intelligent peripheral computer, one service that could be offered to all subscribers, including most businesses and individuals, is least cost routing. As in PBX least cost routing, the routing of a call attempt is dependent on population of a routing table. This table is a memory file containing the cost (or other economic incentive) of call carriage over each route accessed by the switch or other carrier selection data. In accordance with the herein disclosed process, this routing table could be populated by the Moderator, based on carrier selection data it generates, or by a computer adjunct to the switch, based on decision rules entered by a switch administrator. Or, with appropriate software, the adjunct computer function could be incorporated in the switch's peripheral computer. With this combination of software implementations, a telecommunication service provider could offer a least cost routing service, at economically advantageous rates based on a bidding process, to all of its customers.

Figure 8:
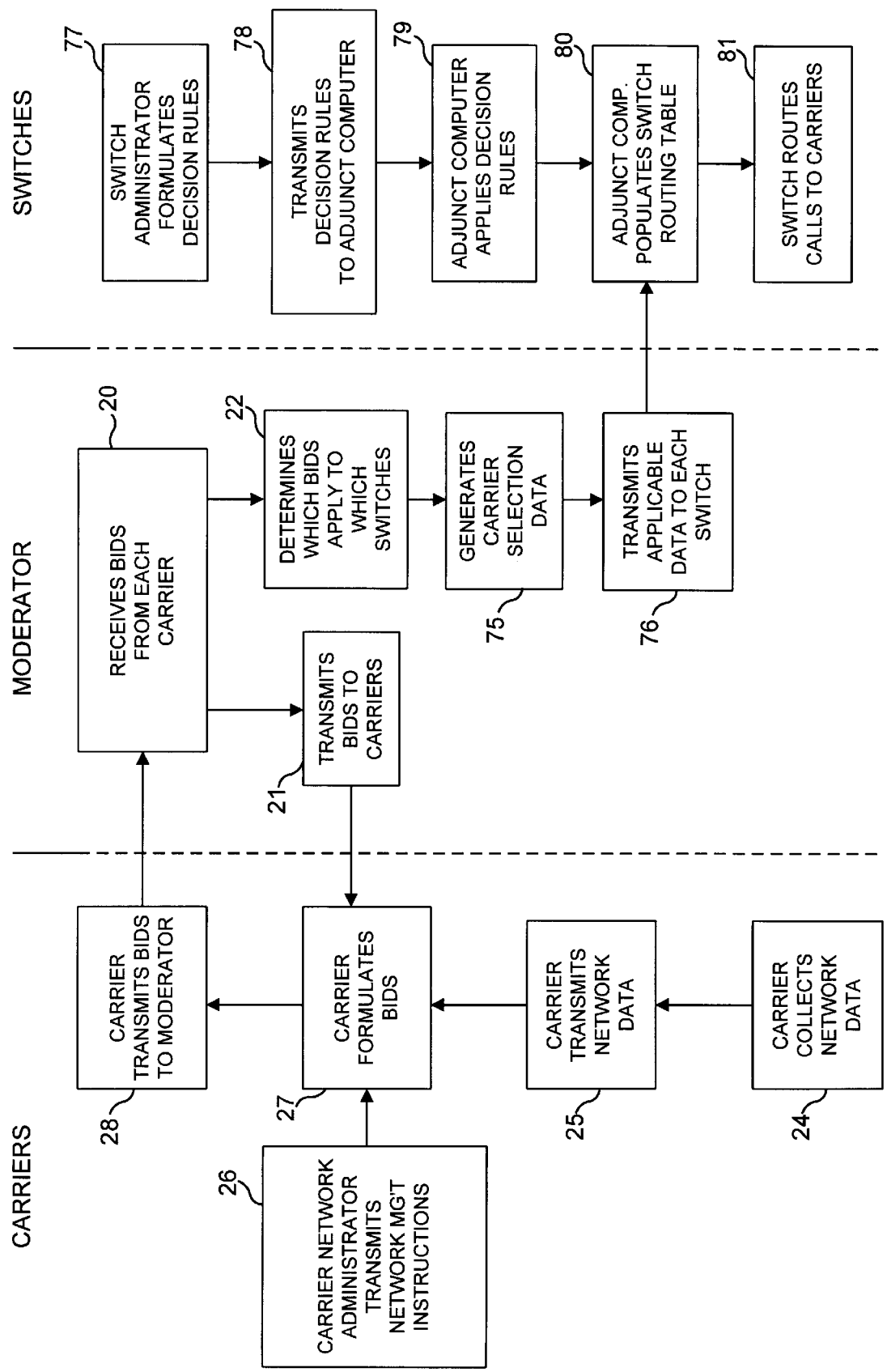
FIG. 8 is a schematic representation of an exemplary process of the invention in which the Moderator generates carrier selection data for the subscribing switches.

As illustrated in FIG. 8, the routing table can be populated with derivative data generated 75 in the Moderator by further processing of the economic incentive data. This could include carrier selection data, prioritizing the Carrier selection in accordance with Carriers' bids for each route segment starting at that switch. The applicable data can be transmitted 76 to each switch, including those in which the adjunct computer populates the switch's routing table 80. While some of the decision making process has been performed by the Moderator (i.e., sorting its bids and generating carrier selection data), the switch makes the ultimate Carrier selection 81 based on network conditions and decision rules from the administrator 77. The network architecture involved is as illustrated in FIG. 6, where the switch 3 represents the combination of the dumb switch and the intelligent peripheral computer and the input and output links 12, 13 represent all of the telecommunication facilities accessed by the switch 3. Another arrangement contemplated by the bidding process is for a local exchange carrier, controlling several switches, to receive the bidding or routing data for all its switches and further process that data for all of its switches.

The bid information being transmitted between the Moderator, the Carriers, and subscribing switches is sensitive business information and may need, under various circumstances, to be encrypted. Depending on how the service is arranged, there may be a need to protect the privacy of bids from interception by other participating Carriers or from interception by non-participating carriers. Some of the most sensitive information would be bid information sent from the Carriers to the Moderator, bid confirmation messages from the Moderator to the Carriers, and carrier selection data sent from the Moderator to the subscribing switching points. Some less sensitive information would be the bids broadcast back to all participating Carriers after the cutoff time for a given block of time. There are several encryption schemes known in the art for such use, including the RSA and PGP schemes.

Figure 5:
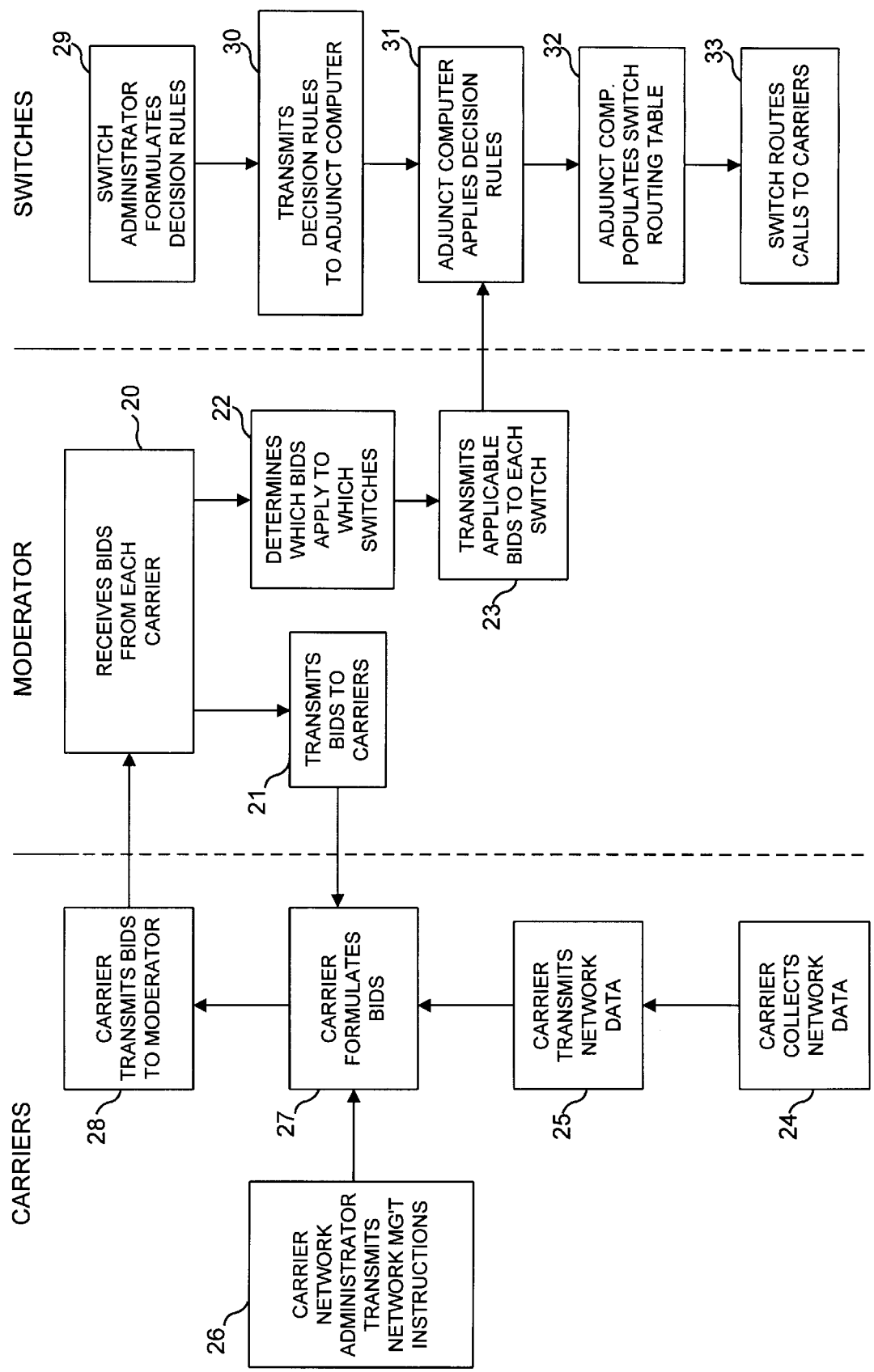
FIG. 5 is a schematic representation of an exemplary process of the invention showing transmission of bid information from the Moderator to the subscribing switches.

FIG. 5 illustrates an exemplary implementation of the bidding process of this invention. The process is carried out by participating Carriers, acting through their network management computers, the bidding service provider, acting through the Moderator computer, and the subscribing switches. The Carriers' primary purpose is to maximize revenue from the carriage of telecommunication traffic over their networks. The subscribing switches are usually managed to obtain telecommunication service most economically.

In operation of this exemplary bidding process, the Moderator receives bids 20 from each Carrier specifying the economic incentive the Carrier is willing to offer for carrying a call over each route segment for which it wishes to place a bid. This information is stored in the computer's memory. At a time appropriate to the particular service arrangement in operation, the Moderator transmits 21 bids received from the Carriers to at least a portion of the Carriers. The Moderator also processes the data in a sorting operation to determine which bids and/or carrier selection data derived from the bids are for route segments that have a starting point associated with each subscribing switch and the Moderator transmits 23 the appropriate bids to each such switch.

Each subscribing switch is operated by a switch administrator that formulates 29 the decision rules. A decision rule may be, for example, a simple instruction to switch a call attempt to the Carrier that has submitted the lowest cost bid. The rules may include an instruction to route all calls in a particular time period (e.g., from midnight to 6:00 A.M.) to a particular Carrier to satisfy the requirements of a contract between the switch's owner and that Carrier, or because that Carrier has contracted to carry all traffic during that time period for a flat monthly fee. The switch administrator may also instruct the switch or an associated adjunct computer to value a non-rate economic incentive in a particular way. The bids and decision rules are received by the switch or associated adjunct computer and stored in a data base in its memory. The switch or associated adjunct computer applies 31 the decision rules to the economic incentive data received as bids and generates the carrier selection data needed to populate the switch's routing table. The decision rules may be transmitted to the Moderator and the carrier selection data can be generated in the Moderator. The carrier selection data can be transmitted to the switch periodically, when generated, or in response to a query from the switch. The query can call for the carrier selection data in full or on a call-by-call basis. The routing table is the file that is accessed by the switch's least cost routing software to decide which Carrier will receive a call attempt. The software will also provide for treatment of failed call attempts (e.g., retry, try the next lowest cost Carrier, or default to the primary Carrier). When a call attempt is presented to the switch, a routing decision is made and the call routed 33 to a Carrier for transmission to the call's destination or to an intermediate switching point. In order to route a call, the subscribing switch's operating software connects the input register carrying the call attempt to the output register connected to telecommunication facilities which connect to the selected Carrier for that route segment.

Routing decisions for each route segment of a call attempt may be made at each switching point (i.e., at the originating switching point or any of the intermediate switching points on the same or different telecommunications networks) as a call attempt is presented to each respective switch. Routing decisions may also be made (e.g., by a central entity such as the Moderator) for all route segments comprising the entire route of a call attempt, from its originating switching point through any and all intermediate switching points to its terminating switching point, at each respective switching point before the call attempt is routed (e.g., in a manner conceptually similar to the call set-up process used today in SS7 signaling networks). Alternatively, routing decisions may be made at any switching point for any group of route segments constituting less than all of the route segments comprising an entire route of a call attempt (e.g., for the remaining portion of a route from any intermediate switching point to its terminating switching point) before the call attempt is routed by that switching point.

Figure 9:
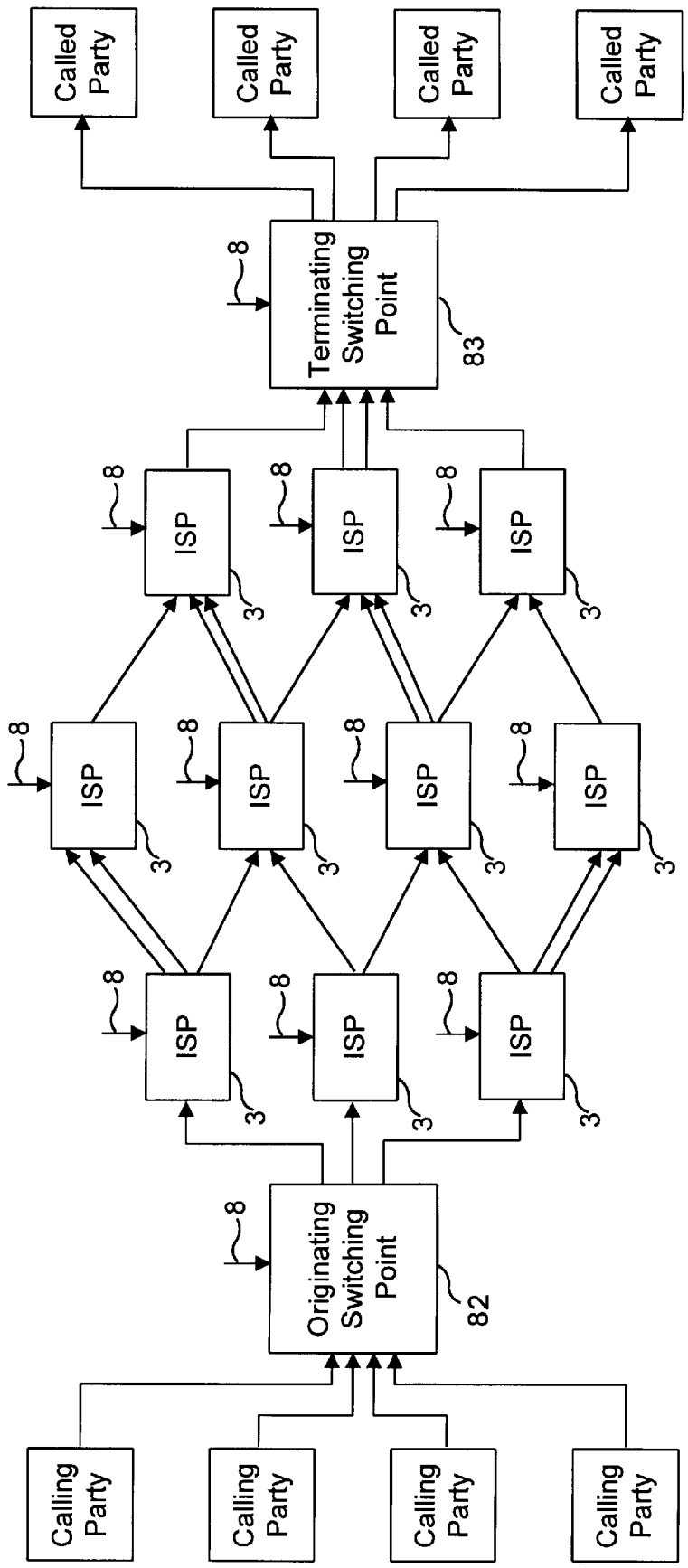
FIG. 9 is a schematic view of an exemplary network architecture in which routing decisions can be made at originating and intermediate switching points to select different route segments for call attempts presented to such switching points, based on data received from the Moderator.

As illustrated in FIG. 9, routing decisions for a call attempt can be made at an originating switching point 82 as well as at intermediate switching points 3 on one or more telecommunications networks, based on bid information and/or carrier selection data transmitted by the Moderator over a data link 8 to the respective switching point presented with the call attempt. ISP stands for Intermediate Switching Point.

On certain types of telecommunication networks (e.g., packet data networks), a call attempt presented to a switch, for which a routing decision can be made, may consist of all or only part of the message or information (whether voice, data, video, etc.) being transmitted during the call by the calling party to the called party. For example, on packet data networks, when a calling party sends a data file to the called party, the network infrastructure would break up this file into a series of individual packets that are separately addressed and transmitted to the called party. Each of these packets may cross over different route segments in traveling from the originating switch to the terminating switch. Each packet can be treated as a call attempt by the originating switching point and by each of the intermediate switching points to which the packet is presented. And a routing decision can be made for each packet at each such switching point.

The transmission of bid information between the Carriers and the Moderator is a feed back process as illustrated, for example, in FIG. 5. Each Carrier transmits 28 its economic incentive bids to the Moderator and the Moderator transmits 21 received bids to each Carrier or at least the portion of the Carriers appropriate to each bid. The Carrier starts its bid formulation by collecting 24 network data, such as the capacity and traffic loading of each network facility, and transmitting 25 this network data to the Carrier's network management computer. The network data can be entered by keying it in or entered over a data link from the Carrier's network operations systems. The Carrier's network administrator enters (e.g., by keying them in or by data link) network management instructions, such as the fact that a particular facility is being taken out of service for maintenance or has a trouble that reduces its transmission capacity. The network management instructions could also be based on network performance characteristics, such as response time, or competitive business factors, such as the intent to compete more intensively for traffic to a specific region of the county or over route segments that compete directly with another specified Carrier.

Software within each Carrier's network management computer then accesses its memory for the network data, the network management instructions, and the bid data received from the Moderator and determines 27 the economic incentive the Carrier will bid for traffic over each route segment. These data are accessed by means of the data buses and registers commonly internal to a computer. These bids are stored in the computer memory and transmitted 28 to Moderator. Since the network management computer has access to the bids of other Carriers, during each bidding cycle each Carrier has the opportunity to adjust its bids in view of the bids of the other Carriers for traffic over each route segment. This adjustment may be accomplished automatically by the software in response to the network management instructions, or may be accomplished by direct input from the network administrator viewing displayed bidding data. The result of such adjustment consideration may be a decision to leave the bid as originally calculated, as being appropriate to accomplish the network administrator's objective.

Figure 10:
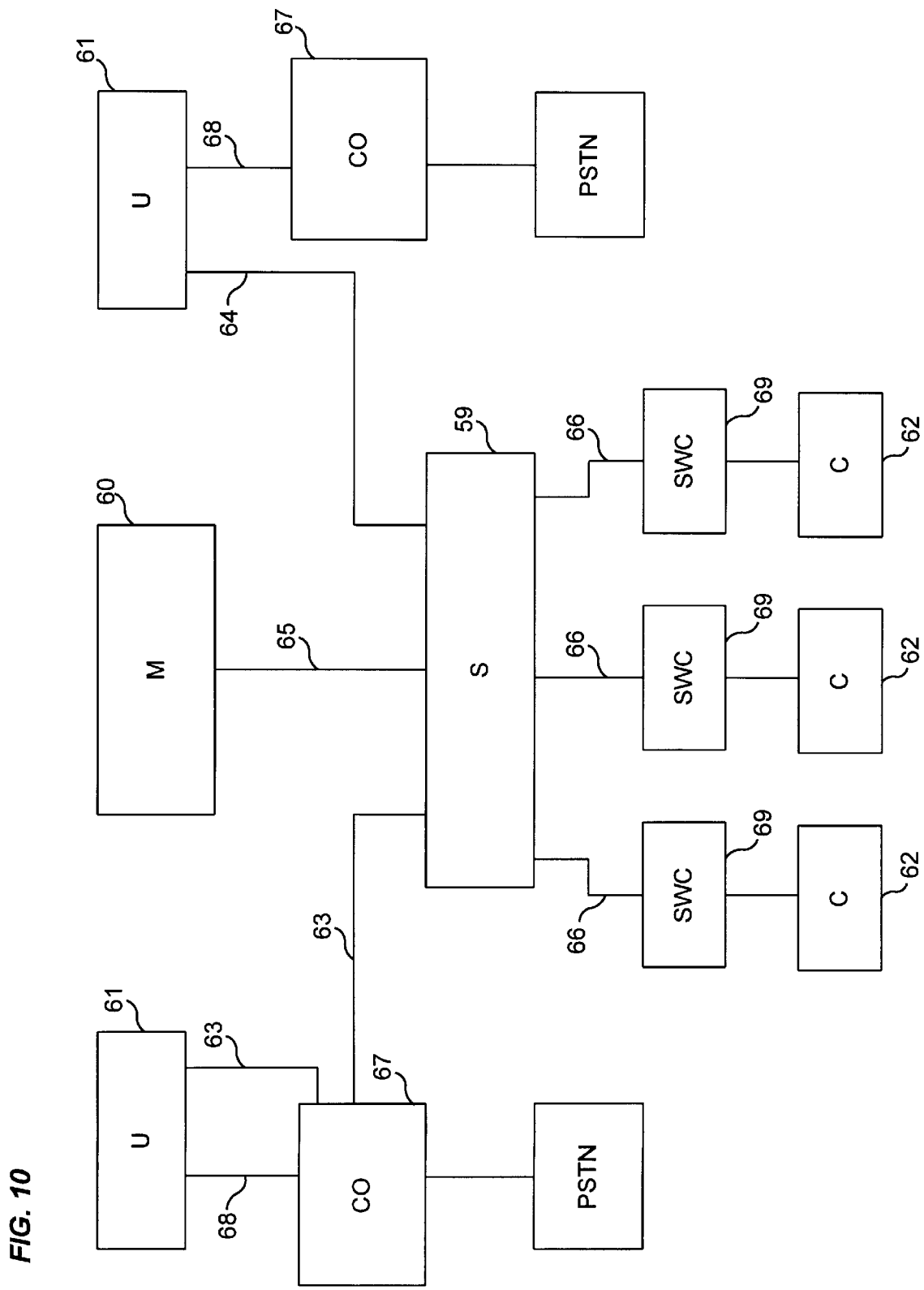
FIG. 10 is a schematic view of an exemplary network architecture in which a Moderator transmits data to a dedicated facility switch.

FIG. 10 illustrates a network architecture that enables large users 61 that route telecommunications traffic to Carriers 62 over dedicated access lines 63, 64 to take advantage of a bidding arrangement. This architecture can be employed by large users who wish to send their telecommunications traffic over different types of networks (e.g., circuit-switched, frame relay, asynchronous transfer mode, packet data, etc.) and use different classes of telecommunications service provided by such networks (e.g., transmission of voice, data, etc.). In this architecture, a bidding Moderator 60 transmits the processed bidding data over a data link 65 independent of the dedicated access facilities 63, 64 carrying the calls from the users 61 to a switch 59 equipped with input and output ports adapted to receive dedicated facilities 63, 64, 66. The bidding data link 65 is also independent of any common channel signaling network associated with the dedicated facilities 63, 64, 66. The dedicated access facilities 63 may be connected, for example, through a local exchange telephone carrier's local central office 67 or routed directly 64 from the user's PBX 61 (or other hardware or software-driven originating facilities) to the switch 59. The users 61 will, typically, also have switched access facilities 68 to a local exchange telephone carrier's local central office 67.

This dedicated facility switch 59 has a switching matrix for switching calls and a software directed switch controller for selecting a Carrier 62 for a call, based on carrier selection data resulting from the bidding process, and routing the call to the selected Carrier 62 for a call, based on carrier selection data resulting from the bidding process, and routing the call to the selected Carrier 62. The call is switched to the dedicated Carrier facility 66 connected to the selected Carrier 62, perhaps by way of a serving wire center 69. Through this architecture, large users 61 sending telecommunications traffic over dedicated facilities can benefit from the bidding process and, for traffic sent by users to the public telehone network, for example, such users can avoid the access charges imposed by local exchange telephone carriers on central office switched access traffic. Even though a dedicated facility 63 may connect through a local exchange telephone carrier's local central office 67, for example, it is given a dedicated, unswitch connection, not triggering the imposition of a switched access rate element.

Figure 11:
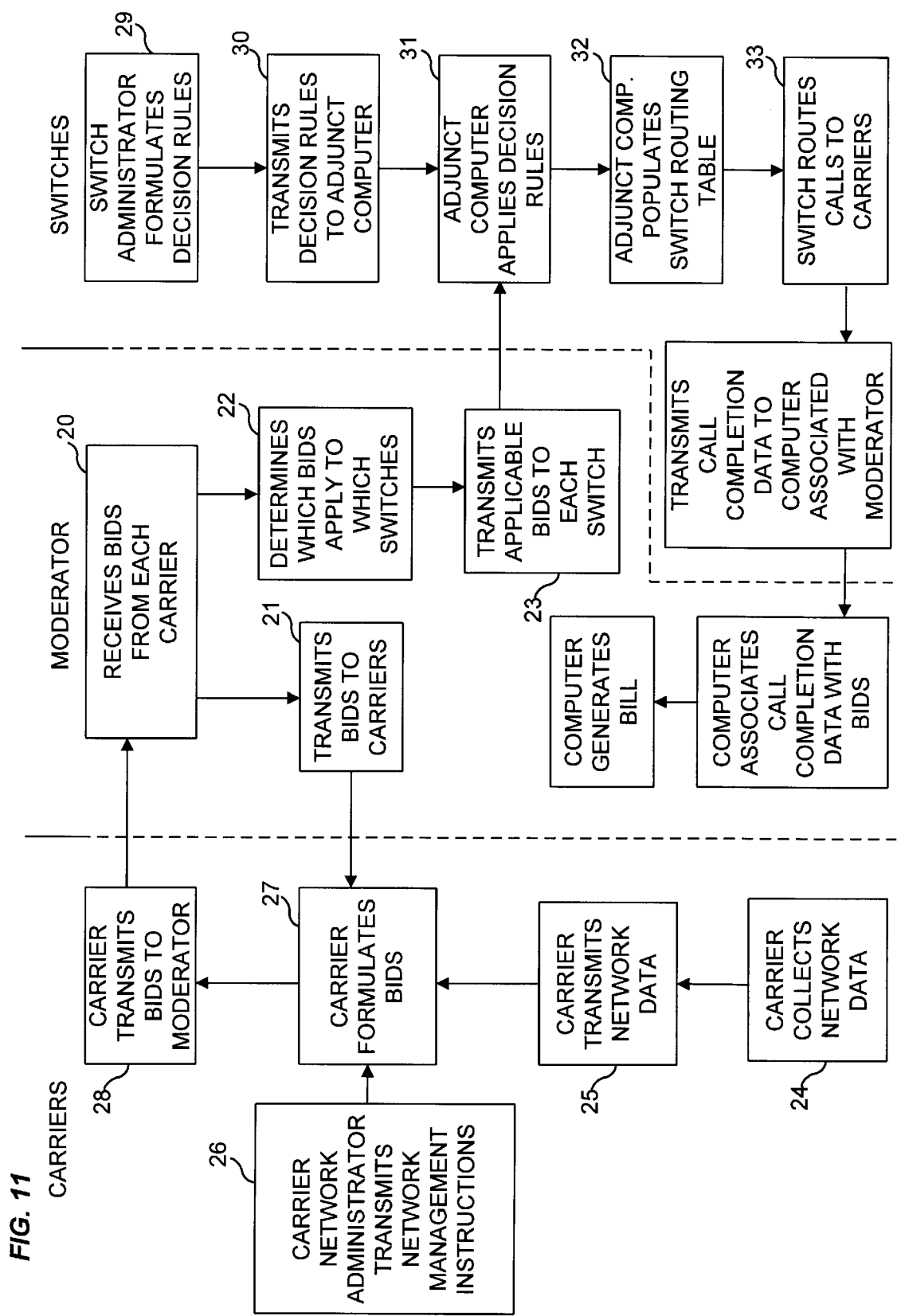
FIG. 11 is a schematic representation of an exemplary process of the invention, including a billing capability.

In order not to require each end user subscribing to the bidding arrangement to establish a billing relationship with each Carrier taking part in the bidding process, a central billing arrangment is advantageous. In the billing arrangement illustrated in FIG. 11, the bidding and routing takes place as illustrated in FIG. 5 or FIG. 8. After the switch routes a call 33, it transmits the call completion data identifying the call source, the Carrier, the applicable route segment data, and any other information necessary for billing purposes (e.g., the time and duration of the call) to a computer associated with the Moderator. The Moderator transmits economic incentive data to this computer. The computer associates the call completion information with this economic incentive data in its memory to form a billing record of the call, which is stored in a billing data base. Periodically (e.g., at the end of each billing period) this computer sorts the billing records by call source identifier and generates a bill.

As an alternative to a computer associated with the Moderator preparing bills, a local exchange telephone carrier, for example, can generate bills for those of its customers participating in the bidding process as callers, by having a computer associated with one or more switches receive economic incentive data from the Moderator and call completion data from the switch. This computer associates the bidding information with the call completion information in its memory to form a billing record of the call, which is stored in a billing data base. Periodically, the computer sorts the billing records by call source identifier and generates a bill.

What is claimed is:

1. A method for controlling a telecommunication network in which a moderating computer collects economic incentive data from each Carrier of a plurality of telecommunication Carriers, processes the economic incentive data and distributes processed data to a plurality of telecommunications switches, defining a plurality of route segments, each switch at a switching point on a telecommunications network, thereby enabling each of the plurality of switches to select a Carrier of the plurality of telecommunication Carriers for a call attempt presented to the switch, based on an economic choice, wherein the method comprises:

a. receiving in the moderating computer, economic incentive data specifying the economic incentive each Carrier will place on a call from a first switch on a telecommunications network of a plurality of telecommunications networks over a route segment to a second switch on a telecommunications network of a plurality of telecommunications networks, processing the economic incentive data to determine which of the economic incentive data correspond to the first switch and optionally to produce derivative data, and storing the economic incentive data and derivative data in a data base of the moderating computer as first switch data;
   b. transmitting at least a portion of the first switch data to the first switch; and
   c. transmitting at least a portion of the first switch data to at least a portion of the plurality of telecommunication Carriers.

2. A method of claim 1 in which the economic incentive data is rate data.

3. A method of claim 1 in which the economic incentive data received from each Carrier is valid for a specified first block of time.

4. A method of claim 3 in which the economic incentive data valid for the first block of time must be received by the moderating computer prior to a cut-off time that precedes the first block of time by at least a protection interval.

5. A method of claim 1 in which the first switch data corresponding to a first Carrier of the plurality of Carriers is the same for all second switches.

6. A method of claim 1 in which the first switch data corresponding to a first Carrier of the plurality of Carriers is the same for all first switches and all second switches.

7. A method of claim 1 in which the derivative data includes carrier selection data.

8. A method of claim 7 in which the carrier selection data includes designation of the selected Carrier.

9. A method of claim 7 in which the carrier selection data includes designation of at least a first alternate Carrier.

10. A method for billing users and telecommunication service providers for call attempts completed over route segments during a billing period by means of an auction process of claim 1, in which the moderating computer collects economic incentive data from each Carrier of a plurality of telecommunication Carriers, processes the economic incentive data and distributes processed data to a plurality of telecommunication switches, thereby enabling each of the plurality of switches to select a Carrier of the plurality of telecommunication Carriers for each call attempt presented to the switch, based on an economic choice, wherein the method comprises:

a. receiving in a computer, economic incentive data from the moderating computer and call completion data from the switch including, at least, a call source identifier, a selected Carrier identifier and route segment data;
   b. associating the call completion data with the economic incentive data to produce a billing record including the call source identifier and the portion of the economic incentive data applied to the call and storing the billing record in a billing data base; and
   c. sorting the billing data base by call source identifier and generating a bill for calls associated with each call source identifier during the billing period.

11. A method for routing a telecommunication call attempt presented to a telecommunication switch on a telecommunications network of a plurality of telecommunications networks, to a first telecommunication Carrier of a plurality of telecommunication Carriers for carriage over a route segment in accordance with economic incentives arrived at through a bidding process involving a central processor, referred to as a bidding Moderator, comprising the steps of:

a. collecting Carrier network data for each of the Carriers, each Carrier entering the data corresponding to the telecommunication facilities constituting route segments of its network into its traffic management computer's traffic management database;
   b. each traffic management computer receiving management instructions from that Carrier's network administrator, formulating economic incentives for at least a portion of the Carrier's telecommunication facilities based on the management instructions and the carrier network data, and transmitting the economic incentives to the bidding Moderator;
   c. in the bidding Moderator, receiving the economic incentives, entering the economic incentives from each Carrier in the bidding Moderator's database, and sorting the economic incentives to identify all economic incentives associated with each telecommunication route segment specified by a first switch and a second switch and generating carrier selection data;
   d. transmitting at least a portion of the economic incentives received by the bidding Moderator to at least a portion of the plurality of Carriers, entering the economic incentives in each traffic management database, and adjusting each Carrier's economic incentives in consideration of the economic incentives form at least one other Carrier;
   e. sorting the route segments to determine which route segments are associated with the telecommunication switch, transmitting at least a portion of the carrier selection data and economic incentive data associated with such route segments to the switch, and entering the carrier selection data into the switch's database; and
   f. routing the call attempt to the first telecommunication Carrier in accordance with the carrier selection data.

12. A method of claim 11 in which the economic incentive is rate.

13. A method of claim 11 including displaying at least a portion of the economic incentives at the traffic management computer of at least one of the plurality of Carriers.

14. A method of claim 11 including querying the bidding Moderator for the carrier selection data.

15. A telecommunication traffic bidding Moderator for enabling a first telecommunication switch of a plurality of telecommunication switches to select a Carrier of the plurality of telecommunication Carriers for call attempts intended for completion over a route segment, in accordance with economic incentives generated by the Carriers, comprising:

a. a computer with a processor and a memory;
   b. means for receiving economic incentive data from a first telecommunication Carrier and storing the economic incentive data identified with the first telecommunication Carrier in the memory;
   c. means for transmitting at least a portion of the economic incentive data received from a plurality of telecommunication Carriers to at least a portion of the plurality of telecommunication Carriers;

d. means for sorting the economic incentive data received from the plurality of telecommunication Carriers to determine a first subset of such data corresponding to the first telecommunication switch and generating carrier selection data; and e. means for transmitting at least a portion of the carrier selection data and economic incentive data to the first telecommunication switch.

16. A bidding Moderator of claim 15 further including means for receiving decision rules from a switch administrator associated with the first telecommunication switch and applying the decision rules to the economic incentive data to generate the carrier selection data.

17. An automated Carrier selection method for enabling a telecommunication switch on a telecommunications network, to select a Carrier of a plurality of telecommunication Carriers for a call attempt in accordance with carrier selection data received from the bidding Moderator of claim 15, for transmission of telecommunications to a second switch on a telecommunications network, comprising the steps of:

a. entering into a data base associated with the switch, the carrier selection data resulting from a bidding process administered by the bidding Moderator relating to at least one Carrier of the plurality of telecommunication Carriers; and b. selecting a Carrier of the plurality of telecommunication Carriers for the call attempt, based on the carrier selection data.

18. A method of claim 17 in which, for a failed call attempt, a first alternate Carrier of the plurality of telecommunication Carriers is selected for the call attempt in accordance with the carrier selection data.

19. A method of claim 17 in which, for a failed call attempt, a default Carrier of the plurality of telecommunication Carriers is selected for the call attempt.

20. A method of claim 17 including displaying at least a portion of the economic incentive data at the switch.

21. A method of claim 17 including overriding the Carrier selection and selecting an alternate Carrier on the basis of decision rules from a switch administrator.

22. An automated call routing system for selecting a first telecommunication Carrier of a plurality of telecommunication Carriers for a call attempt presented to a telecommunication switch for routing over a route segment, comprising:

a. a telecommunication switch;

b. a computer adjunct to the telecommunication switch, which adjunct computer has a processor and a memory;

c. means for receiving carrier selection data from the bidding Moderator of claim 20 and storing the carrier selection data in the memory;

d. means for transmitting the carrier selection data to the switch for entry into the switch's database; and e. means for selecting the first telecommunication Carrier for carriage of the call attempt over the route segment, based on the carrier selection data in the switch's database.

23. An automated call routing system for selecting a first telecommunication Carrier of a plurality of telecommunication Carriers for a call attempt presented to a telecommunication switch for routing over a route segment, comprising:

a. a telecomnunication switch;

b. a computer adjunct to the telecommunication switch, which adjunct computer has a processor and a memory;

c. means for receiving carrier selection data from the bidding Moderator of claim 15 and storing the carrier selection data in the memory;

d. means for transmitting the carrier selection data to the switch for entry into the switch's database; and e. means for selecting the first telecommunication Carrier for carriage of the call attempt over the route segment, based on the carrier selection data in the switch's database, wherein the switch comprises a dumb switch and an intelligent peripheral computer.

24. A call routing system of claim 23 in which the adjunct computer is a software defined portion of the intelligent peripheral computer.

25. A call routing system of claim 22 including means for querying the bidding Moderator for the carrier selection data.

26. An automated call routing system for routing a call attempt presented to a telecommunication switch to a first telecommunication Carrier of a plurality of telecommunication Carriers for carriage over a route segment, comprising;

a. a telecommunication switch;

b. means for querying the bidding Moderator of claim 15 for carrier selection data resulting from a bidding process administered by the bidding Moderator corresponding to the call attempt and receiving the carrier selection data in the switch; and c. means for routing the call attempt to the first telecommunication Carrier for carriage over the route segment in accordance with the carrier selection data.

27. A telecommunication switch for selecting a first Carrier of a plurality of telecommunication Carriers for routing a call attempt entering the switch over a dedicated facility, from the switch to the first Carrier for carriage over a route segment, based on first switch data produced by the bidding Moderator of claim 15 through a bidding process, the telecommunication switch comprising;

a. a switching matrix controlled by a software directed switch controller;

b. a plurality of input ports for receiving call attempts presented to the telecommunication switch over dedicated access facilities from a plurality of call sources;

c. a plurality of output ports for transmitting the call attempts to a plurality of telecommunication Carriers over dedicated carrier facilities;

d. a data link input port for receiving first switch data from the bidding Moderator over a data link independent of the dedicated access facilities and the dedicated carrier facilities;

e. software implemented means for selecting the first Carrier on the basis of the first switch data from a data link independent of the dedicated access facilities or the dedicated carrier facilities; and f. means for routing the call attempt over the route segment from the call source to the first Carrier through the switching matrix.

28. A switch of claim 27 comprising, for a failed call attempt, means for selecting a first alternate Carrier of the plurality of telecommunication Carriers for the call attempt in accordance with the carrier selection data.

29. A switch of claim 27 comprising, for a failed call attempt, means for selecting a default Carrier of the plurality of telecommunication Carriers for the call attempt.

30. A switch of claim 27 in which the first switch data comprises at least a portion of the Carrier selection data and economic incentive data.

31. A switch of claim 27 including means for overriding the selection produced by the means for selecting the first Carrier, and selecting an alternate Carrier, in accordance with carrier designation data associated with the dedicated access facility carrying the call.

32. A method for switching telecommunication traffic presented to a switch over a plurality of dedicated access facilities to a plurality of telecommunication Carriers over a plurality of dedicated carrier facilities for carriage over a plurality of route segments, based on first switch data from the bidding Moderator of claim 15, comprising:

a. receiving in the switch a call attempt over a dedicated access facility from a call source;

b. receiving in the switch at least a portion of the first switch data associated with the switch, from the bidding Moderator, said data resulting from a bidding process administered by the bidding Moderator;

c. selecting a first Carrier of the plurality of telecommunication Carriers, based on at least a portion of the first switch data; and d. switching the call attempt over a dedicated carrier facility to the first Carrier for carriage over a route segment.

33. A method of claim 32 including querying the bidding Moderator for at least a portion of the first switch data.

34. A method of claim 32 in which the first switch data includes economic incentive data and carrier selection data, and selecting is based on the economic incentive data.

35. A method of claim 32 in which the first switch data includes economic incentive data and carrier selection data, and selecting is based on the carrier selection data.

36. A method of claim 32 in which the first switch data includes carrier selection data and the carrier selection data includes designation of the most economically advantageous Carrier for the call attempt and, optionally, succeeding designations in order of economic advantage and designation of a default Carrier.

* * * * *